United States Patent [19]

Barry

[11] Patent Number: 5,301,230
[45] Date of Patent: Apr. 5, 1994

[54] VIEWING SHIELD FOR A TELEPHONE DIALING PAD

[76] Inventor: Benjamin W. Barry, 4323 Dry Fork Rd., Whites Creek, Tenn. 37189

[21] Appl. No.: 927,003

[22] Filed: Aug. 10, 1992

[51] Int. Cl.⁵ .............................. H04M 1/00
[52] U.S. Cl. ..................... 379/447; 379/450
[58] Field of Search ........... 379/447, 369, 437, 453, 379/450

[56] References Cited

U.S. PATENT DOCUMENTS

| | | |
|---|---|---|
| 1,492,096 | 4/1924 | Bohlman ..................... 379/369 |
| 2,948,377 | 8/1960 | Kennedy . |
| 3,247,332 | 4/1966 | McHugh . |
| 3,338,002 | 9/1967 | Ericsson et al. ............... 379/453 |
| 4,267,411 | 5/1198 | Raines . |
| 4,441,143 | 4/1984 | Richardson, Jr. . |
| 4,568,803 | 2/1986 | Frola . |
| 4,763,352 | 8/1988 | Goff . |
| 4,845,869 | 7/1989 | Martin . |
| 5,034,979 | 7/1991 | Erickson ..................... 379/447 |

Primary Examiner—James L. Dwyer
Assistant Examiner—Jack Chiang
Attorney, Agent, or Firm—George Pappas

[57] ABSTRACT

A viewing shield for use on a telephone front wall for preventing observation of the dialing pad by individuals other than the caller. The viewing shield includes side walls that are located in close proximity to and on opposite sides of the dialing pad. The side walls are attached to a back wall section which is, in turn, attached to the telephone front face wall. The viewing shield side walls extend away from the dialing pad and telephone front wall and curve toward one another. An access opening is provided between the two side walls wherethrough the caller may reach the dialing pad with his fingers and enter the desired numbers.

20 Claims, 2 Drawing Sheets

VIEWING SHIELD FOR A TELEPHONE DIALING PAD

TECHNICAL FIELD

The present invention relates to the technical field of dialing pads of telephones located in public places. More specifically, the present invention relates to a viewing shield for a telephone dialing pad whereby the dialing pad is shielded from view except through an access opening.

BACKGROUND OF THE INVENTION

Telephones have now been in use in public places for quite some time. These public telephones quite often require coins to make a telephone call therefrom. A call is generally made by placing coins in a slot in the phone and, thereafter, dialing the desired telephone number. In the past, rotary-type dial pads were common whereas now most phones are equipped with touchtone type dialing pads.

More recently, access to public telephones has become available through the use of credit card numbers. Rather than requiring coins for making a telephone call, both local and long distance telephone line carriers are providing credit card numbers to their customers for their use in making calls and through which the customer's account is billed. In this regard, the individual having a credit card number need only dial his/her credit card number on the telephone dialing pad thereby gaining access to the telephone lines and making his/her telephone call. The individual making the call is, thereafter, billed for the cost of the telephone call in a monthly or some other timely statement.

Unfortunately, there are those unscrupulous thieves who obtain another's telephone credit card number and, thereafter, use it for their own unauthorized benefit. Once another's telephone credit card number is obtained without the card owner's knowledge, numerous telephone calls can be made at the expense of the telephone credit card holder or the telephone line carriers. In fact, the credit card number owner/holder quite often doesn't know that his/her credit card number has become known to others until after a statement is received showing the telephone calls not made by the credit card holder. Unfortunately, even though the credit card number can be canceled at that time, the damage has already been done. In addition, catching the thief is literally impossible.

More often than not, a thief learns of another's telephone credit card number by looking over one's shoulder as the credit card number is punched into a telephone dial pad. In fact, some thieves have been known to use binoculars to view from a distance the use of another's credit card number.

Accordingly, a need exists for a reliable means of preventing thieves from stealing one's credit card number while, nevertheless, allowing the credit card holder to use his/her credit card number. This need is especially present for telephones located in public places.

SUMMARY OF THE INVENTION

It is the principal object of the present invention to overcome the above-discussed problems associated with telephone credit card number theft. More specifically, it is the object of this invention to prevent thieves from being able to view a telephone dialing pad as a telephone credit card holder dials in his/her credit card number.

The present invention solves the problems of telephone credit card number theft by providing a viewing shield near the telephone dialing pad. The shield includes a first side wall situated in close proximity to and on one side of the dialing pad. A second side wall is also provided in close proximity to but on the opposite side of the dialing pad. Both the first and the second side walls extend generally away from the dialing pad and the front wall of the telephone, thus, creating an access opening between the first and second side walls wherethrough an individual may place his/her fingers and use the dial pad. However, the shield side walls prevent an unscrupulous individual off to the side and therebehind from viewing the dial pad as the telephone credit card holder enters his/her credit card number on the dial pad.

The dialing pad and telephone front wall are generally vertically situated on a public telephone. Thus, the viewing shield side walls are preferably also generally vertically situated, are parallel to one another and are on the left and right sides of the dialing pad as would be viewed by the telephone caller.

Preferably, both side walls are curved toward the dial pad or the access opening as they extend away from the dial pad thereby decreasing the access opening size and, further shielding the dialing pad from view. Rather than attaching the side walls directly to the dial pad sides or telephone front wall, a back wall section is preferably provided extending between and attaching the two side walls to one another. The back wall section is then attached to the telephone front wall thereby retaining both side walls in their relative positions. The back wall section is attached to the telephone front wall with a plurality of threaded bores located in the back wall section and threaded screws extending through corresponding holes in the telephone front wall and threadingly received in the respective threaded bores. In this fashion, a positive attachment is provided in a manner whereby the viewing shield cannot easily be removed from the telephone front wall. A plurality of guide pins are provided on the back wall section and are received in corresponding guide pin holes on the telephone front wall so that the side walls can be properly located on the front wall.

In an alternate embodiment, the back wall section is detachably attached to the telephone front wall through the use of a magnet affixed to the back wall section and which detachably carries the viewing shield on the telephone front wall.

More preferably, the viewing shield is located on the front wall of a public telephone in a manner whereby the dial tone lever extends out from the telephone front wall and is located vertically above the dial pad and vertically below the back wall section. Here, the telephone handset can be hung up on the dial tone lever in a manner whereby it is situated inbetween the two side walls. Most preferably, the viewing shield side walls are made of a corrosive resistant steel or metal or other suitable material.

In one form thereof, the present invention is directed to a viewing shield for a telephone dialing pad. The shield includes a first side wall in close proximity to and on a first side of a dialing pad. The first side wall extends generally away from the dialing pad. A second side wall is provided in close proximity to and on a second side of the dialing pad. The second side wall also extends generally away from the dialing pad. An access opening is provided between the first and second side walls wherethrough the dialing pad may be used. Thus, the dialing pad is shielded from view except through the access opening.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein.

Corresponding reference characters indicate corresponding parts throughout the several views of the drawings.

Figure 1:
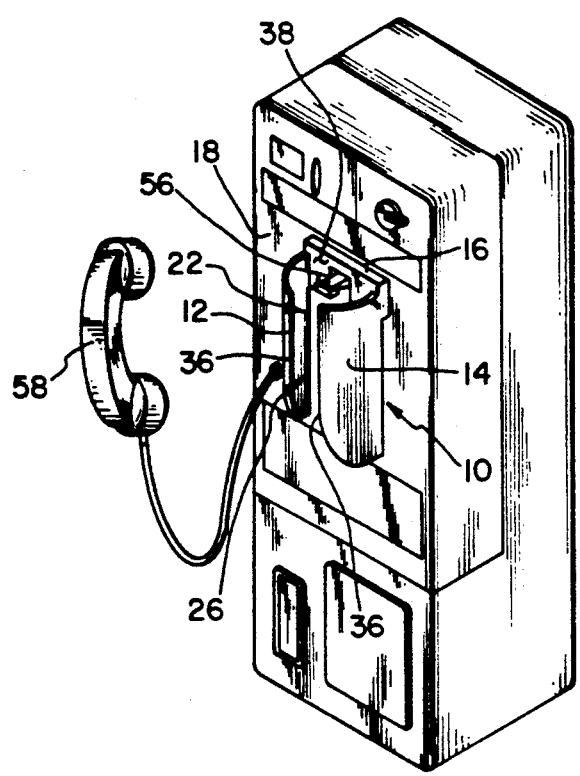
FIG. 1 is a perspective view of a public telephone and showing the viewing shield in perspective attached thereto according to the present invention.
Figure 3:
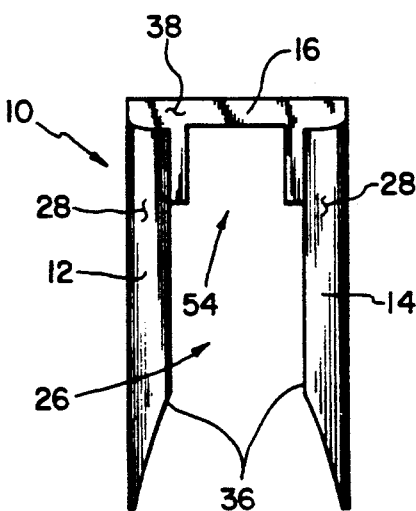
FIG. 3 is a front elevational view of the viewing shield shown in FIG. 1.
Figure 4:
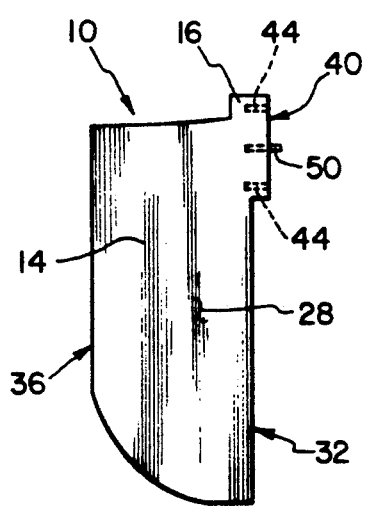
FIG. 4 is a side elevational view of the viewing shield shown in FIG. 1.

The exemplifications set out herein illustrate preferred embodiments of the invention in one form thereof and such exemplifications are not to be construed as limiting the scope of the disclosure or the scope of the invention in any manner.

DETAILED DESCRIPTION OF THE PREFERRED EMBODIMENT

Referring now to the drawings, a preferred embodiment of a viewing shield for a telephone dialing pad is generally indicated as 10. Viewing shield 10 includes a first side wall 12 and a second side wall 14 connected to one another via a back wall section 16.

Figure 2:
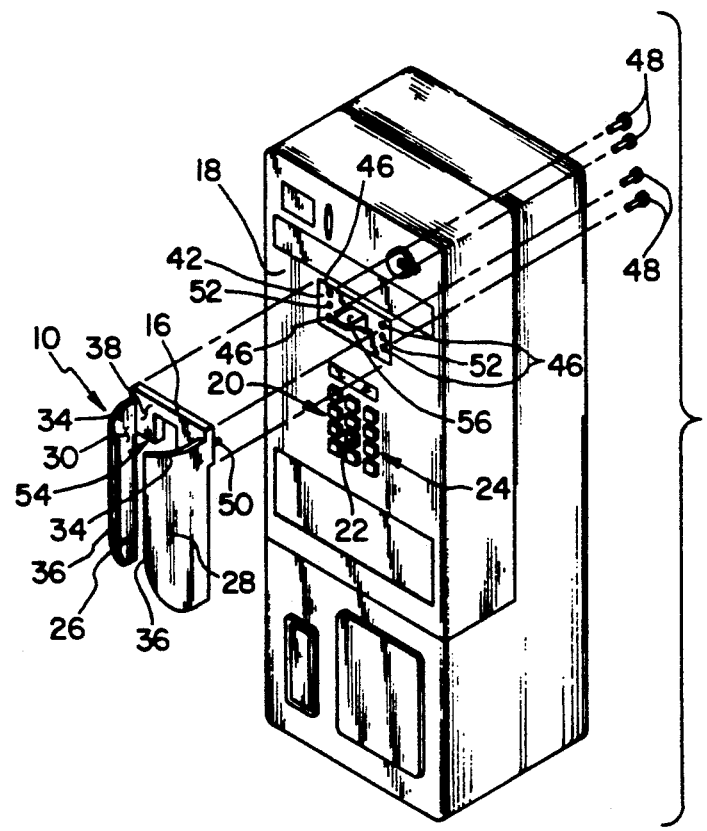
FIG. 2 is a perspective exploded view showing a means of attachment of the viewing shield shown in FIG. 1 to a telephone front wall.
Figure 5:
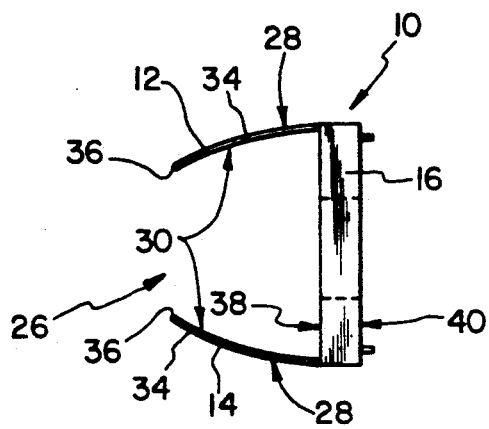
FIG. 5 is a top plan view of the viewing shield shown in FIG. 1.
Figure 6:
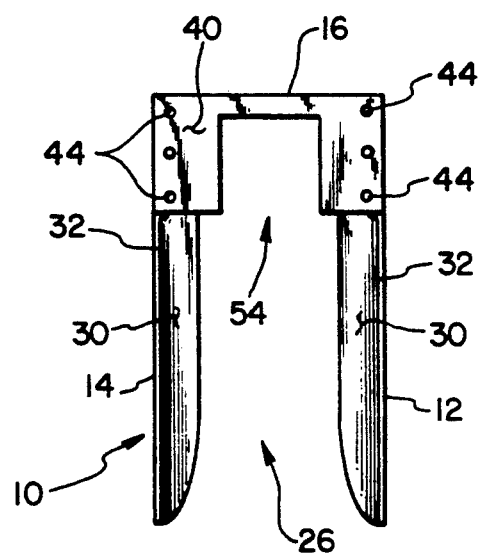
FIG. 6 is a back elevational view of the viewing shield shown in FIG. 1.

As shown in FIGS. 1 and 2, the viewing shield is adapted for and is attached to a public telephone front wall 18. More specifically, first side wall 12 is located in close proximity to and on a first side 20 of dialing pad 22. Second side wall 14 is located in close proximity to and on the second side 24 of dialing pad 22. As shown, both first and second side walls 12 and 14 extend generally away from the telephone front wall 18 and dialing pad 22 and thereby create an access opening 26 therebetween wherethrough the dialing pad may be reached by an individual's fingers and through which credit card numbers and telephone numbers can be dialed thereon. As also more clearly shown in FIG. 1, first and second side walls 12 and 14 shield dialing pad 22 from view from the side but not through the access opening 26. Thus, an individual using dialing pad 22 can freely enter a credit card number without those looking toward the dialing pad therebehind and off to the side being able to view the numbers being dialed.

Because public telephones are most often vertically situated, both front wall 18 and dialing pad 22 of the public telephones are also vertically situated as shown in FIGS. 1 and 2. Preferably, therefore, first and second side walls 12 and 14 are generally vertically situated on front wall 18 and are also generally parallel to one another. More specifically, first side wall 12 is located on the left vertical first side 20 of dialing pad 22 and second side wall 14 is located on the second vertical side 24 of dialing pad 22 as viewed by the telephone caller looking at the telephone front wall 18.

First and second side walls 12 and 14 are preferably mirror images of one another and are curved toward dialing pad 22 or access opening 26 as shown. This curvature of side walls 12 and 14 effectively decreases the size of access opening 26 and further shields dialing pad 22 from view. In the preferred embodiment as shown, both first and second side walls 12 and 14 include an outer curved face 28, an inner curved face 30, a back edge 32, a top curvilinear edge 34, and an access opening creating edge 36. At least top edge 34 and access opening edge 36 are generally rounded and free of burs and sharp edges so as to prevent injury to the individual using the dialing pad 22.

The upper area of back edge 32 of each of side walls 12 and 14 are integrally connected to back wall section 16 front face 38. Back wall 16 is generally rectangularly-shaped and also has a back face 40 adapted to abut and fit within a recess 42 of telephone front wall 18. A plurality of threaded bores 44 are provided and extend into back wall section 16 from back face 40. Threaded bores 44 correspond in location to a plurality of holes 46 on telephone front face 18 and threaded screws 48 are received through holes 46 and threadingly engage threaded bores 44 for retaining viewing shield 10 on front face 18 as shown in FIG. 1. As can be appreciated, this is a positive means of attachment preventing the potential detachment of viewing shield 10 without access to the interior of the public telephone.

So as to further aid in the proper placement of viewing shield 10, a plurality of guide pins 50 are provided on back wall section 16 extending out from back face 40. Guide pins 50 are received within guide pin holes 52 located on the telephone front wall 18. Guide pins 50 are especially helpful in properly locating viewing shield 10 on front face 18 especially during the initial installation thereof with screws 48.

Back wall section 16 has a cut-out 54 that is generally square shaped and is adapted to receive therethrough the telephone dial tone lever 56. Dial tone lever 56 extends forward of back wall front face 38 and toward access opening 26. Dial tone lever 56 is, thus, located vertically above the dial pad 22 and vertically below at least a portion of back wall section 16. Most preferably, side walls 12 and 14 along with access opening 26 are sized so that telephone handset 58 can be placed on dial tone lever 56 in a known and customary manner for hanging up the telephone but, here, also fitting between side walls 12 and 14 in access opening 26.

Figure 7:
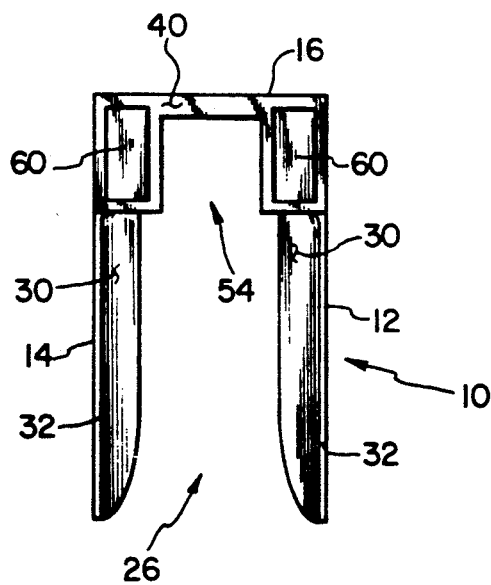
FIG. 7 is a back elevational view of the viewing shield and showing a different attachment means.

In an alternate embodiment as shown in FIG. 7, viewing shield 10 is adapted for detachable attachment to the telephone front face wall 18. In this regard, a set of magnets 60 are affixed to back wall section 16 by countersinking the magnets 60 within the back wall section from back face 40. Magnets 60 are, thus, provided for selectively holding shield 10 on the metallic surface of recess 42 located on front wall 18. This embodiment is, thus, intended to be carried by individuals and detachably attached on telephones for use thereof in preventing viewing of the dial pad 22 during use. At the conclusion of the telephone call, this viewing shield embodiment is merely pulled off of the front face 18 and stored by the individual for later use.

In the most preferred embodiment, viewing shield 10 is made of a corrosive-resistant steel, or metal or other suitable corrosive-resistant material. Furthermore, in the most preferred embodiment, side walls 12 and 14 extend approximately 2 inches away from front face wall 18 and are vertically approximately 5 inches in length. The access opening is approximately 1¾" in width thereby providing observation of dialing pad 22 from only up to approximately 15 radial degrees from center to left and center to right. Accordingly, viewing of the dialing pad 22 by someone standing to the side and behind the caller is made virtually impossible with the viewing shield 10 installed on the telephone as shown in FIG. 1.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A viewing shield for a telephone dialing pad, said shield comprising:
   a first side wall in close proximity to and on a first side of a dialing pad, said first side wall extending generally away from said dialing pad;
   a second side wall in close proximity to and on a second side of said dialing pad, said second side wall extending generally away from said dialing pad;
   an access opening between said first and second side walls wherethrough the dialing pad is used, whereby said dialing pad is shielded from view except through said access opening; and, wherein said first and second side walls extend partially over the dialing pad thereby decreasing the size of said access opening and further shielding the dialing pad from view.

2. The viewing shield of claim 1 wherein the dialing pad is a generally vertically situated dialing pad on a front wall of a public telephone and said first and second side walls are generally vertically situated and generally parallel to one another.

3. The viewing shield of claim 2 wherein said first and second side walls are curved toward said access opening thereby decreasing the size of said access opening and further shielding the dialing pad from view.

4. The viewing shield of claim 3 further comprising a back wall section extending between and attaching said first and second side walls to one another, said back wall section detachably attached to said telephone front wall and retaining said first and second walls.

5. The viewing shield of claim 4 wherein said back wall section includes a magnet affixed to said back wall for selectively holding said shield upon a metallic surface located on said telephone front wall.

6. The viewing shield of claim 3 further comprising a back wall section extending between and attaching said first and second side walls to one another, said back wall section attached to the telephone front wall and retaining said first and second side walls thereon.

7. The viewing shield of claim 6 wherein said back wall section includes a threaded bore and a screw extending through a hole in the telephone front wall threadingly received in said threaded bore.

8. The viewing shield of claim 7 further comprising a guide pin extending from said back wall section and received in a guide pin hole on the telephone front wall whereby said first and second side walls are located with respect to the dial pad.

9. The viewing shield of claim 6 further comprising a guide pin extending from said back wall section and received in a guide pin hole on the telephone front wall whereby said first and second side walls are located with respect to the dial pad.

10. The viewing shield of claim 2 further comprising a back wall section extending between and attaching said first and second side walls to one another, said back wall section attached to the telephone front wall and retaining said first and second side walls thereon.

11. The viewing shield of claim 10 wherein said back wall section includes a threaded bore and a screw extending through a hole in the telephone front wall threadingly received in said threaded bore.

12. The viewing shield of claim 10 further comprising a guide pin extending from said back wall section and received in a guide pin hole on the telephone front wall whereby said first and second side walls are located with respect to the dial pad.

13. The viewing shield of claim 10 wherein a dial tone lever extends out from said telephone front wall and is located vertically above said dial pad, a portion of said back wall located vertically above said dial tone lever.

14. The viewing shield of claim 1 wherein said first and second side walls are curved toward said access opening thereby decreasing the size of said access opening and further shielding the dialing pad from view.

15. The viewing shield of claim 14 further comprising a back wall section extending between and attaching said first and second side walls to one another, said back wall section attached to a telephone front wall and retaining said first and second side walls thereon.

16. The viewing shield of claim 15 wherein said back wall section includes a threaded bore and a screw extending through a hole in the telephone front wall threadingly received in said threaded bore.

17. The viewing shield of claim 15 further comprising a guide pin extending from said back wall section and received in a guide pin hole on the telephone front wall whereby said first and second side walls are located with respect to the dial pad.

18. The viewing shield of claim 15 wherein a dial tone lever extends out from said telephone front wall and is located vertically above said dial pad, a portion of said back wall located vertically above said dial tone lever.

19. The viewing shield of claim 1 further comprising a back wall section extending between and attaching said first and second side walls to one another, said back wall section attached to a telephone front wall and retaining said first and second side walls thereon.

20. The viewing shield of claim 1 wherein said side walls are made of corrosion-resistant material.

* * * * *